US00RE38742E

(19) United States
(12) Reissued Patent
Hacikyan

(10) Patent Number: US RE38,742 E
(45) **Date of Reissued Patent: *Jun. 14, 2005**

(54) QUICK CHANGE BIT HOLDER

(75) Inventor: Michael Hacikyan, Williamsville, NY (US)

(73) Assignee: Techniglass Corporation, Amherst, NY (US)

( * ) Notice: This patent is subject to a terminal disclaimer.

(21) Appl. No.: 10/242,159

(22) Filed: Sep. 12, 2002

Related U.S. Patent Documents

Reissue of:
(64) Patent No.: 6,241,589
Issued: Jun. 5, 2001
Appl. No.: 09/598,519
Filed: Jun. 21, 2000

(51) Int. Cl.[7] ..... B24B 1/00
(52) U.S. Cl. ..... 451/59; 451/495
(58) Field of Search ..... 451/59, 495, 504, 451/505, 513, 489, 490

(56) References Cited

U.S. PATENT DOCUMENTS

| | | | | | |
|---|---|---|---|---|---|
| 2,458,217 | A | | 1/1949 | Staggs | 51/190 |
| 2,804,914 | A | | 9/1957 | Butcko et al. | 155/183 |
| 2,971,765 | A | | 2/1961 | Atherholt, Sr. | 279/4 |
| 3,232,011 | A | | 2/1966 | Pineau | 51/373 |
| 3,362,113 | A | * | 1/1968 | Feather | 451/487 |
| 3,496,685 | A | | 2/1970 | Schmidt | 51/373 |
| 3,977,127 | A | | 8/1976 | Mahnken | 51/6 |
| 4,229,014 | A | | 10/1980 | Crowe | 279/2 A |
| 4,600,238 | A | | 7/1986 | Goodford | 297/219 |
| 4,676,376 | A | | 6/1987 | Keiswetter | 206/494 |
| 4,723,814 | A | | 2/1988 | Hunt | 297/219 |
| 4,897,968 | A | | 2/1990 | Hutt | 51/373 |
| 4,955,665 | A | | 9/1990 | Richer | 297/4 |
| 5,185,970 | A | | 2/1993 | Fiocchi | 51/372 |
| 5,330,251 | A | | 7/1994 | McGuire | 297/229 |
| 5,351,447 | A | | 10/1994 | Grauert | 451/505 |
| 5,483,812 | A | * | 1/1996 | Dempsey | 72/252.5 |
| 5,672,096 | A | | 9/1997 | Amarosa, Sr. et al. | 451/504 |
| 5,829,828 | A | | 11/1998 | Asfaw | 297/219.1 |
| 6,083,086 | A | | 7/2000 | Hacikyan | 451/59 |

FOREIGN PATENT DOCUMENTS

| | | | | |
|---|---|---|---|---|
| SU | 1535677 A | * | 1/1990 | B23B/31/40 |

* cited by examiner

*Primary Examiner*—M. Rachuba
(74) *Attorney, Agent, or Firm*—Walter W. Duft

(57) ABSTRACT

The present invention is an expanding device for supporting grinding sleeves. The device has a cylindrical member with an outer bushing unit, an interior bushing unit, an upper control unit, an expanding unit, and a locking mechanism. The outer bushing unit receives the grinding sleeve, and has a first outer diameter of D, and a height H. The interior bushing unit receives a rotatable shaft, has a second outer diameter of I, which is less than D, and a height J, which is less than H. The expanding unit extends from within the upper control unit and between the outer and interior bushing units with protrusions below the outer and interior bushing units. The locking mechanism is interconnected to the upper control unit. And when the locking mechanism is in the unlocked position, a grinding sleeve, which can have diamonds thereon, can be placed on or taken off the outer bushing unit and the device can be placed on or taken off a rotatable shaft. Obviously, when the locking mechanism is in the locked position, the grinding sleeve is locked in place on the outer bushing unit, and the device is secured to a rotatable shaft because the locking mechanism alter the position of the expanding unit *and the upper control unit* which expands the outer diameter and shortens the height of the outer bushing unit, and simultaneously expands the interior diameter and shortens the height of the interior bushing unit.

25 Claims, 3 Drawing Sheets

Amended

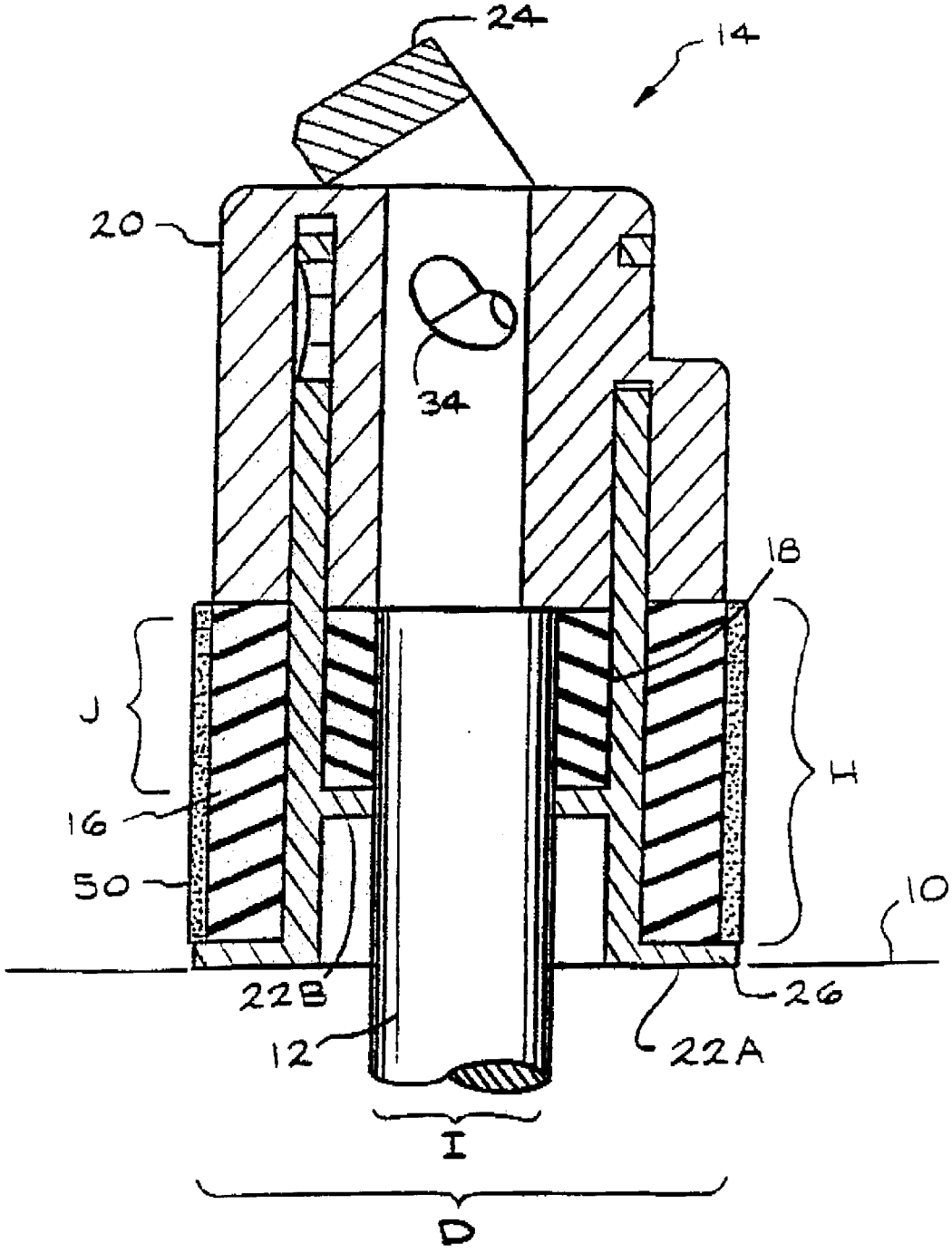
FIG. 1
Amended

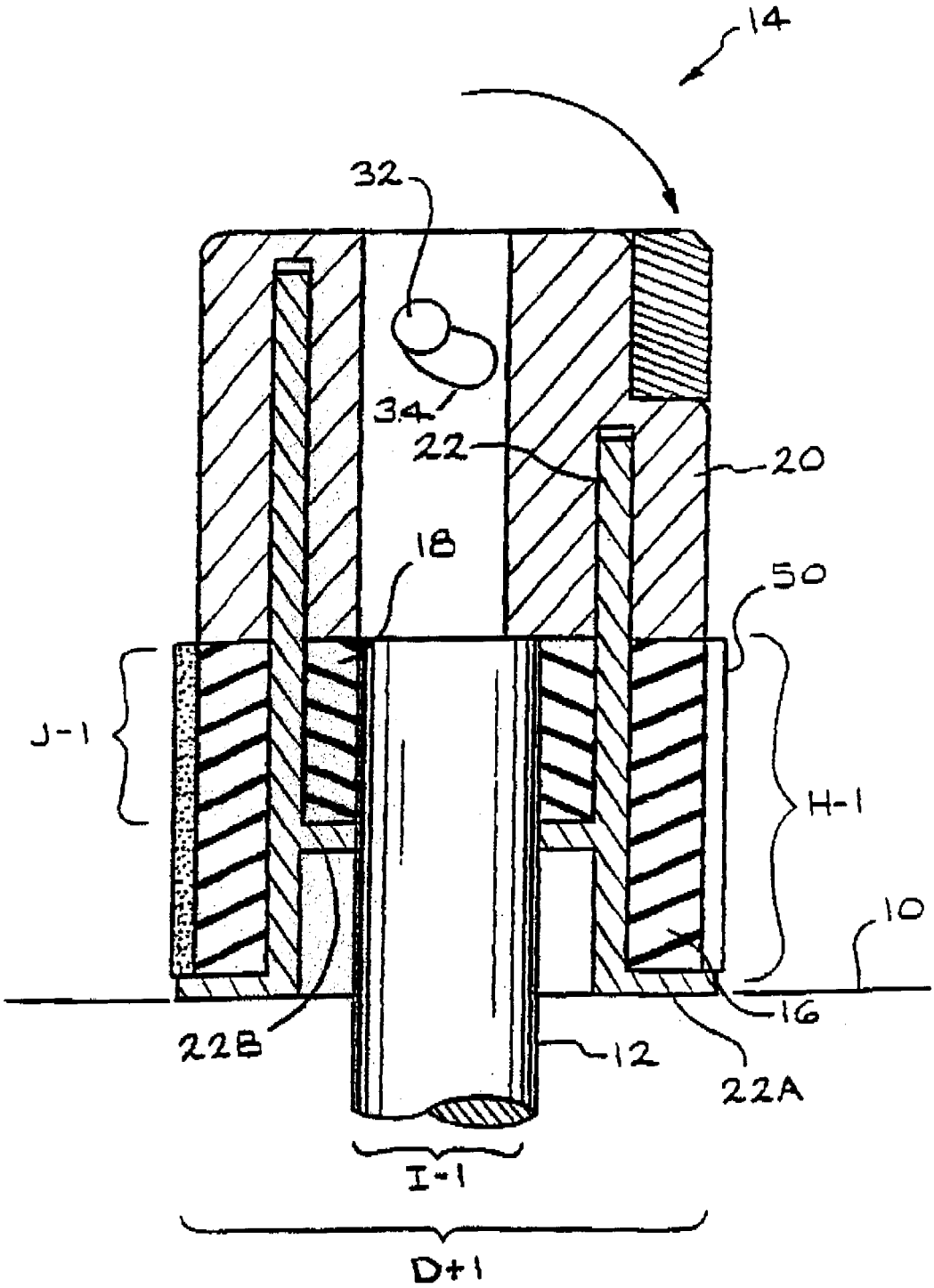
FIG. 2
Amended

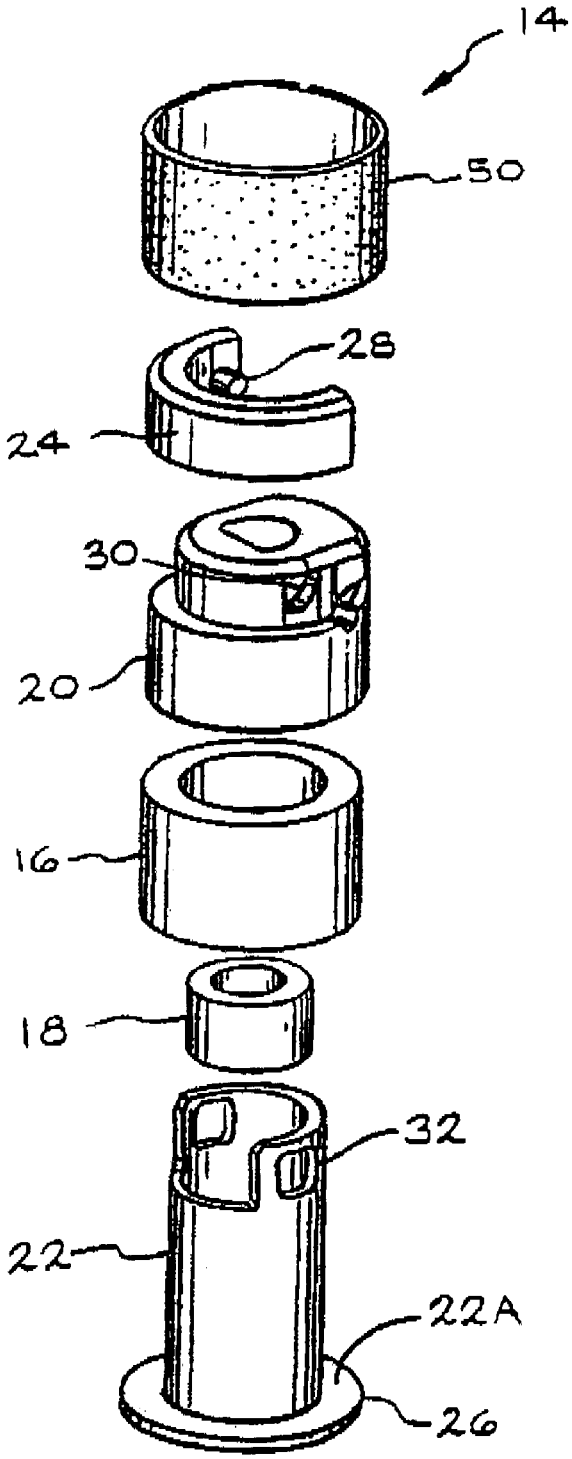
FIG. 3
Amended

QUICK CHANGE BIT HOLDER

Matter enclosed in heavy brackets [ ] appears in the original patent but forms no part of this reissue specification; matter printed in italics indicates the additions made by reissue.

FIELD OF THE INVENTION

The present invention relates to glass grinders.

BACKGROUND OF THE INVENTION

Fiocchi in U.S. Pat. No. 5,185,970 discloses a conventional expanding device for supporting grinding sleeves. The expanding device has "a shaped shaft which concentrically supports a plurality of mutually facing disks which can slide in an axial direction and which are rigidly rotationally connected with the shaft. The disks define, between one another in cooperation, a plurality of peripheral seats for the accommodation of elastic rings which can expand radially upon the axial compression of the disks. The elastic rings are suitable for engaging the inner surface of an emery cloth sleeve." Abstract of U.S. Pat. No. 5,185,970.

A hand tool must be used to adjust that shaft which in turns expands or contracts those elastic rings. For some people, hand tools are difficult to use for such small objects.

In U.S. patent application Ser. No. 09/267,175 (now [allowed] *U.S. Pat. No. 6,083,086*) and assigned to applicant, Technicor, Inc., the inventor Hacikyan discloses "an expanding device for supporting grinding sleeves. The device has a cylindrical member with an outer surface, an interior chamber, an expanding chamber, and a locking mechanism. The outer surface receives the grinding sleeve and has a first outer diameter of D. The interior chamber receives a rotatable shaft and has a second outer diameter of I, which is less than D. The expanding chamber comprises an expanding material that expands and contracts based upon pressure applied thereon and has a third outer diameter of H and an inner diameter of J, wherein H and J are both greater than I and less than D. The locking mechanism has an open position and a closed position and requires no hand tool to alter its position. When the locking mechanism is in the open position the locking mechanism applies a pressure P to the expanding chamber so the first outer diameter is D, the second outer diameter is I, the third outer diameter is H, and the inner diameter is J. In contrast, when the locking mechanism is in the closed position the locking mechanism applies a pressure Z, which is greater than P, to the expanding material so the first outer diameter and the third outer diameter expand, and the second outer diameter and inner diameter contract." The present invention is a preferred embodiment of this embodiment.

SUMMARY OF THE INVENTION

The present invention is an expanding device for supporting grinding sleeves. [The] *In an exemplary embodiment, the* device has a cylindrical member with an outer bushing unit, an interior bushing unit, an upper control unit, an expanding unit, and a locking mechanism. The outer bushing unit receives the grinding sleeve, and has a first outer diameter of D, and a height H. The interior bushing unit receives a rotatable shaft, has a second outer diameter of I, which is less than D, and a height J, which is less than H. The expanding unit extends from within the upper control unit and between the outer and interior bushing units with protrusions below the outer and interior bushing units. The locking mechanism is interconnected to the upper control unit. And when the locking mechanism is in the unlocked position, a grinding sleeve, which can have diamonds thereon, can be placed on or taken off the outer bushing unit and the device can be placed on or taken off a rotatable shaft. Obviously, when the locking mechanism is in the locked position, the grinding sleeve is locked in place on the outer bushing unit, and the device is secured to a rotatable shaft because the locking mechanism alter the position of the expanding unit *and the upper control unit* which expands the outer diameter and shortens the height of the outer bushing unit, and simultaneously expands the interior diameter and shortens the height of the interior bushing unit.

BRIEF DESCRIPTION OF THE DRAWINGS

FIG. 1 is a cross-sectional view of an expanding device in the unlocked position.

FIG. 2 is a cross-sectional view of an expanding device in the locked position.

FIG. 3 is an exploded view of FIG. 1.

DETAILED DESCRIPTION OF THE PRESENT INVENTION

U.S. patent application Ser. No. 09/267,175 (now [allowed] *U.S. Pat. No. 6,083,086*), which is commonly assigned and incorporated by reference in this application, describes in detail a multi-purpose grinding machine 10 with a rotatable shaft 12. (Numbers cited in this application do not correspond to the numbers used in that application.)

Turning to FIG. 1, the present invention relates to an expanding device 14 for supporting grinding sleeves [14] *50*. The device 14 is cylindrical with an outer bushing unit 16, an interior bushing unit 18, an upper control unit 20, an expanding unit 22, and a locking mechanism 24.

The outer bushing unit 16 receives the grinding sleeve [14] *50*. The outer bushing unit 16 has a first outer diameter of D that receives the sleeve 50 and a height of H.

The interior bushing unit 18 receives a rotatable shaft 12. The interior bushing unit 18 has an outer diameter of I, which is less than D and a height J, which is less than H. The outer bushing unit 16 and interior bushing unit 18 are made of materials that expand when a pressure is applied to them. Examples of these expandable materials include plastic and certain alloys known to those skilled in the art.

The expanding unit 22 comprises an expanding material that expands and contracts based upon pressure applied thereon. Examples of the expanding material include, and not limited to, rubber, metal, polyethylene and other known expandable polymers. The expanding unit 22 extends from within the upper control unit and between the outer and interior bushing units 16, 18 with protrusions 22A and 22B, respectively, below the outer and interior bushing units 16, 18 to secure units 16, 18 in place. In particular, protrusion 22A extends beyond the outer diameter D to form a ledge 26 to hold the sleeve 50 in place.

The locking mechanism [26] *24* is unlocked in FIG. 1, and locked in FIG. 2, and requires no hand tool to alter between the two positions of locked and unlocked. Turning to FIG. 3, the locking mechanism [26] *24* has a set of protrusions 28. The upper control unit 20 and the expanding unit 22 have corresponding sets of apertures 30, 32 that receive the protrusions 28. When the locking mechanism is unlocked, as illustrated in FIG. 1, the outer bushing unit 16, the interior bushing unit 18, the upper control unit 20, and the expanding unit 22 maintain their original shape, which allows the grinding sleeve 50 to be placed on or removed from device 14, and/or allows the device 14 to be placed on or removed from the rotating shaft 12.

In contrast, when the locking mechanism [26] *24* is locked, as shown in FIG. 2, the upper control unit 20 and the expanding unit 22 are moved. The upper control unit 20 *moves* towards the outer and interior bushing units 16, 18[. And], *and* the expanding unit *moves* toward the upper control unit 20. These movements result in the outer bushing unit 16 attaining a wider outer diameter D+1, greater than D, and shorter height H−1; and the interior bushing unit 18 attaining a narrower interior diameter I−1, and a shorter height J−1. By locking the device 14 in place, the sleeve 50 and the shaft 12 are securely attached to the device 14.

The locking mechanism [26] *24* is further secured in position by a conventional eccentric cam [32] *34*, known to those skilled in the art. The eccentric cam *34* locks and unlocks the locking mechanism 26.

The grinding sleeve 50 can be sandpaper, diamond, emery cloth or any conventional material that grinds metal, wood, or plastic materials. The grinding sleeve 50 is cylindrical or any other shape that fits upon one size of device 14, in particular the outer bushing unit 16. When diamonds are used, the diamonds are bonded to the grinding sleeve by conventional electroplating methods or other conventional methods, like adhesives. These sleeves are not screwed, or attached in other mechanical means, onto the device 14. Instead the grinding sleeve 50 relies on the pressure provided by the outer bushing unit 16 to remain in position, even with a diamond surface.

Numerous variations will occur to those skilled in the art. It is intended therefore, that the foregoing descriptions be only illustrative of the present invention and that the present invention be limited only by the hereinafter appended claims.

I claim:

1. A grinding device comprising a cylindrical member with an outer bushing unit, an interior bushing unit, an upper control unit, an expanding unit, and a locking mechanism;

wherein the outer bushing unit receives a grinding sleeve, and has, when the locking mechanism is in an unlocked position, a first outer diameter of D, and a height H;

wherein the interior bushing unit receives a rotatable shaft, has, when the locking mechanism is in an unlocked position, a second outer diameter of I, which is less than D, and a height J, which is less than H;

wherein the expanding unit extends from within the upper control unit and at least portions thereof between the outer bushing unit and interior bushing unit, and the expanding unit has a first protrusion below and contacting the outer bushing unit and a second protrusion below and contacting interior bushing unit;

wherein the locking mechanism is interconnected to the upper control unit so that when the locking mechanism is in the unlocked position, the grinding sleeve can be placed on or taken off the outer bushing unit and the device can be placed on or taken off a rotatable shaft;

and when the locking mechanism is in the locked position, the locking mechanism pulls the expanding unit towards the upper control unit and pushes the upper control unit towards the expanding unit which expands the outer diameter and shortens the height of the outer bushing unit, and expands the interior diameter and shortens the height of the interior bushing unit.

2. The device of claim 1 wherein the sleeve has diamonds.

3. The device of claim 2 wherein the diamonds are electroplated onto the sleeve.

4. The device of claim 1 wherein the sleeve rests on the first protrusion.

5. A method of securing a grinding sleeve to an expanding device comprising the steps of:

placing a cylindrical member upon the rotatable shaft wherein the cylindrical member has an outer bushing unit, an interior bushing unit, an upper control unit, an expanding unit, and a locking mechanism;

wherein the outer bushing unit receives a grinding sleeve, and has, when the locking mechanism is in an unlocked position, a first outer diameter of D, and a height H;

wherein the interior bushing unit receives a rotatable shaft, has, when the locking mechanism is in an unlocked position, a second outer diameter of I, which is less than D, and a height J, which is less than H;

wherein the expanding unit extends from within the upper control unit and at least portions thereof between the outer bushing unit and interior bushing unit, and the expanding unit has a first protrusion below and contacting the outer bushing unit and a second protrusion below and contacting interior bushing unit;

wherein the locking mechanism is interconnected to the upper control unit so that when the locking mechanism is in the unlocked position, the grinding sleeve can be laced on or taken off the outer bushing unit and the device can be placed on or taken off a rotatable shaft;

sliding the grinding sleeve upon the outer bushing unit when the locking mechanism is in the unlocked, and placing the device onto a rotatable shaft;

positioning the locking mechanism into the locked position so the locking mechanism pulls the expanding unit towards the upper control unit and pushes the upper control unit towards the expanding unit which expands the outer diameter and shortens the height of the outer bushing unit, and expands the interior diameter and shortens the height of the interior bushing unit, which secures the sleeve to the device and the device to the rotating shaft.

6. The method of claim 5 wherein the sleeve has diamonds.

7. The method of claim 6 wherein the diamonds are electroplated onto the sleeve.

8. The method of claim 5 wherein the sleeve rests on the first protrusion.

*9. A grinding sleeve holder for securing a grinding sleeve on a rotatable shaft, comprising:*

*a support unit;*

*a control unit;*

*a sleeve locking unit adapted to engage the grinding sleeve;*

*a shaft locking unit adapted to engage the rotatable shaft;*

*said support unit and said control unit being arranged for cooperative manipulation of said sleeve locking unit and said shaft locking unit into respective locking engagement with the grinding sleeve and the rotatable shaft; and*

*a locking mechanism operatively interconnecting said support unit and said control unit, said locking mechanism being adapted to effect said manipulation of said sleeve locking unit and said shaft locking unit.*

*10. The grinding sleeve holder of claim 9 wherein said sleeve locking unit comprises a bushing member.*

*11. The grinding sleeve holder of claim 9 wherein said sleeve locking unit comprises a pressure expandable material and is adapted to lock the grinding sleeve by way of expansion.*

*12. The grinding sleeve holder of claim 9 wherein said shaft locking unit comprises a bushing member.*

*13. The grinding sleeve holder of claim 9 wherein said shaft locking unit comprises a pressure expandable material and is adapted to lock the rotatable shaft by way of expansion.*

*14. In combination, a grinding sleeve and grinding sleeve holder for mounting the grinding sleeve on a rotatable shaft, comprising:*

*a grinding sleeve;*

*a support unit;*

*a control unit;*

*a sleeve locking unit adapted to engage said grinding sleeve;*

*a shaft locking unit adapted to engage the rotatable shaft;*

*said support unit and said control unit being arranged for cooperative manipulation of said sleeve locking unit and said shaft locking unit into respective locking engagement with said grinding sleeve and the rotatable shaft; and*

*a locking mechanism operatively interconnecting said support unit and said control unit, said locking mechanism being adapted to effect said manipulation of said sleeve locking unit and said shaft locking unit.*

*15. The combination of claim 14 wherein said sleeve locking unit comprises a bushing member.*

*16. The combination of claim 14 wherein said sleeve locking unit comprises a pressure expandable material and is adapted to lock the grinding sleeve by way of expansion.*

*17. The combination of claim 14 wherein said shaft locking unit comprises a bushing member.*

*18. The combination of claim 14 wherein said shaft locking unit comprises a pressure expandable material and is adapted to lock the rotatable shaft by way of expansion.*

*19. The combination of claim 14 wherein said grinding sleeve is adapted for use in a glass grinder.*

*20. A method for securing a grinding sleeve to a rotatable shaft of a grinding machine, comprising:*

*selecting a grinding sleeve;*

*selecting a sleeve holder comprising:*

*a support unit;*

*a control unit;*

*a sleeve locking unit adapted to engage said grinding sleeve;*

*a shaft locking unit adapted to engage the rotatable shaft;*

*said support unit and said control unit being arranged for cooperative manipulation of said sleeve locking unit and said shaft locking unit into respective locking engagement with said grinding sleeve and the rotatable shaft; and*

*a locking mechanism operatively interconnecting said support unit and said control unit, said locking mechanism being adapted to effect said manipulation of said sleeve locking unit and said shaft locking unit;*

*placing said grinding sleeve on said sleeve locking unit to form a grinding sleeve unit;*

*placing said grinding sleeve unit on the rotatable shaft; and*

*actuating said locking mechanism to simultaneously lock said grinding sleeve to said sleeve locking unit and said shaft locking unit to the rotatable shaft.*

*21. A method for securing a grinding sleeve to a rotatable shaft, comprising simultaneously generating a shaft gripping force and a sleeve gripping force to respectively effect locking engagement with the rotatable shaft while effecting locking engagement with the grinding sleeve, thereby securing the grinding sleeve to the rotatable shaft.*

*22. The method of claim 21 wherein said shaft gripping force and said sleeve gripping force are simultaneously generated by activating a locking mechanism from an unlocked position to a locked position.*

*23. The method of claim 22 wherein said grinding sleeve is a glass grinding sleeve and said rotatable shaft is part of a glass grinder.*

*24. In combination:*

*a grinding sleeve;*

*a grinding sleeve holder for securing said grinding sleeve to a rotatable shaft of a grinding machine;*

*sleeve locking means on said grinding sleeve holder for locking said grinding sleeve to said grinding sleeve holder;*

*shaft locking means on said grinding sleeve holder for locking said grinding sleeve holder to the rotatable shaft; and*

*actuating means for simultaneously effecting locking engagement of said sleeve locking means to said grinding sleeve and of said shaft locking means to the rotatable shaft.*

*25. A grinding sleeve holder for securing a grinding sleeve on a rotatable shaft, comprising:*

*grinding sleeve locking means for locking the grinding sleeve to the grinding sleeve holder;*

*shaft locking means for locking the grinding sleeve holder to the rotatable shaft; and*

*actuating means for simultaneously effecting locking engagement of said grinding sleeve locking means to the grinding sleeve and of said shaft locking means to the rotatable shaft.*

* * * * *